United States Patent
Klein et al.

(10) Patent No.: US 10,223,305 B2
(45) Date of Patent: Mar. 5, 2019

(54) INPUT/OUTPUT COMPUTER SYSTEM INCLUDING HARDWARE ASSISTED AUTOPURGE OF CACHE ENTRIES ASSOCIATED WITH PCI ADDRESS TRANSLATIONS

(71) Applicant: International Business Machines Corporation, Armonk, NY (US)

(72) Inventors: Matthias Klein, Wappingers Falls, NY (US); Eric N. Lais, Georgetown, TX (US); Darwin W. Norton, Jr., Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

(21) Appl. No.: 15/193,905

(22) Filed: Jun. 27, 2016

(65) Prior Publication Data
US 2017/0371816 A1    Dec. 28, 2017

(51) Int. Cl.
*G06F 13/42* (2006.01)
*G06F 15/16* (2006.01)
(Continued)

(52) U.S. Cl.
CPC .......... *G06F 13/28* (2013.01); *G06F 12/0891* (2013.01); *G06F 12/1009* (2013.01); *G06F 13/4027* (2013.01); *G06F 2212/60* (2013.01)

(58) Field of Classification Search
None
See application file for complete search history.

(56) References Cited

U.S. PATENT DOCUMENTS 8,595,437 B1 * 11/2013 Glasco ................ G06F 12/0804
                                                                711/118
9,191,455 B2 * 11/2015 Kawabata ............... H04L 67/02
(Continued)

OTHER PUBLICATIONS

Klien et al., "Input/Output Computer System Including Hardware Assisted Autopurge of Cach Entries Associated With PCI Address Translations," U.S. Appl. No. 15/923,004, filed Mar. 16, 2018.
(Continued)

*Primary Examiner* — Hyun Nam
(74) *Attorney, Agent, or Firm* — Cantor Colburn LLP; Steven Chiu

(57) ABSTRACT

A computing system includes a processor and a memory unit that stores program instructions. The system purges an entry from an address translation cache in response to the processor executing the program instructions to perform issuing, via an operating system running on the computing system, a command indicating a request to perform an I/O transaction requiring a translation entry. A host bridge monitors a total data length of the address translation entry to be transferred during the I/O transaction. An address translation entry is selected from an address translation table, loaded into the address translation cache, and data corresponding to the I/O transaction is transferred using the selected address translation entry. The host bridge automatically purges the selected address translation entry from the address translation cache in response to determining the transferred amount of data matches the total data length for the address translation entry.

13 Claims, 4 Drawing Sheets

(51) Int. Cl.
*G06F 13/28* (2006.01)
*G06F 12/1009* (2016.01)
*G06F 12/0891* (2016.01)
*G06F 13/40* (2006.01)

(56) References Cited

U.S. PATENT DOCUMENTS

| | | | |
|---|---|---|---|
| 9,262,197 | B2 | 2/2016 | Chawla et al. |
| 9,600,433 | B2 | 3/2017 | Mandhani et al. |
| 9,645,938 | B2 * | 5/2017 | Kranich ............... G06F 12/0891 |
| 2003/0140199 | A1 * | 7/2003 | Kunkel ............... G06F 9/30043 |
| | | | 711/141 |
| 2006/0218354 | A1 * | 9/2006 | Sartorius ............ G06F 12/0804 |
| | | | 711/143 |
| 2007/0038797 | A1 | 2/2007 | McBride et al. |
| 2007/0073814 | A1 * | 3/2007 | Kamat .................... H04L 51/22 |
| | | | 709/206 |
| 2009/0070461 | A1 * | 3/2009 | Oh .................... G06F 17/30132 |
| | | | 709/224 |
| 2014/0108738 | A1 * | 4/2014 | Kim .................... G06F 12/0891 |
| | | | 711/136 |
| 2016/0292082 | A1 | 10/2016 | Craddock et al. |

OTHER PUBLICATIONS

List of IBM Patents or Patent Applications Treated as Related; Date Filed: Mar. 22, 2018, 2 pages.

* cited by examiner

INPUT/OUTPUT COMPUTER SYSTEM INCLUDING HARDWARE ASSISTED AUTOPURGE OF CACHE ENTRIES ASSOCIATED WITH PCI ADDRESS TRANSLATIONS

BACKGROUND

The disclosure relates generally to input/output computer systems, and more particular, management of peripheral-component-interconnect (PCI) devices utilized in synchronous input/output computer systems.

A peripheral-component-interconnect (PCI) interface such as peripheral-component-interconnect express (PCIe), for example, may transfer data between main storage and the PCI function's storage by means of direct-memory-access (DMA) read/write requests. A DMA operation initiated by a PCI function may be targeted to one of several DMA address spaces in main storage. The PCI virtual address used by the DMA operation undergoes a dynamic address translation into an absolute address within the configuration to which the PCI function is attached. The I/O subsystem may provide a high-speed cache of past PCI address-translations, reducing the number of main-storage accesses needed to perform subsequent translations. Such a cache is generally referred to as a translation-lookaside buffer (TLB). During the life of a PCI DMA address space, translation parameters (e.g., region-table entries, segment-table entries, and page table entries) used by the PCI address-translation mechanism may need to be altered by the operating system. However, since the I/O subsystem may have cached translation parameters used in past translations, the operating system is required to purge any TLB entries corresponding to the altered translation table entries.

Whenever a PCI address with a different backing address is reused, the address range for the affected device must be purged in order to avoid reuse of stale AT entries. Conventional systems utilize firmware (i.e. software), which on each change in the mapping of PCI addresses, forces a purge of the PCI address translations associated with the device. However, latency and CPU cycles are consumed each time the firmware outputs the purge command, e.g., each time the firmware outputs a refresh PCI translation (RPCIT) millicode command.

SUMMARY

At least one non-limiting embodiment provides a method of purging an address translation cache included in a computing system. The method comprises issuing, via an operating system running on the computing system, a command indicating a request to perform an input/output (I/O) transaction requiring one or more address translation entries. The method further comprises determining, via a host bridge, a total data length of the address translation entry to be transferred during the I/O transaction. The method further comprises selecting an address translation entry from an address translation table, loading the address translation entry into the address translation cache, and transferring data corresponding to the I/O transaction using the selected address translation entry. The method further comprises monitoring, via the host bridge, the amount of data transferred using the selected address translation entry. The method further comprises automatically purging the selected address translation entry from the address translation cache, via the host bridge, in response to determining the transferred amount of data matches the total data length for the address translation entry.

According to another non-limiting embodiment, a computer program product comprises a computer readable storage medium having program instructions for purging an address translation cache included in a computing system. The program instructions are executable by a processor to perform operations of issuing, via an operating system running on the computing system, a command indicating a request to perform an input/output (I/O) transaction requiring one or more address translation entries. The operations further include determining, via a host bridge, a total data length of the address translation entry to be transferred during the I/O transaction. The operations further include selecting an address translation entry from an address translation table, loading the address translation entry into the address translation cache, and transferring data corresponding to the I/O transaction using the selected address translation entry. The operations further include monitoring, via the host bridge, the amount of data transferred using the selected address translation entry. The operations further include automatically purging the selected address translation entry from the address translation cache, via the host bridge, in response to determining the transferred amount of data matches the total data length for the address translation entry.

According to yet another non-limiting embodiment, a computing system comprises a processor and a memory unit that stores program instructions. The system is configured to purge an entry from an address translation cache in response to the processor executing the program instructions to perform issuing, via an operating system running on the computing system, a command indicating a request to perform an input/output (I/O) transaction requiring one or more address translation entries. The system is further configured to determine, via a host bridge, a total data length of the address translation entry to be transferred during the I/O transaction. The system is further configured to select an address translation entry from an address translation table, load the address translation entry into the address translation cache, and transfer data corresponding to the I/O transaction using the selected address translation entry. The system is further configured to monitor, via the host bridge, the amount of data transferred using the selected address translation entry; and automatically purge the selected address translation entry from the address translation cache, via the host bridge, in response to determining the transferred amount of data matches the total data length for the address translation entry.

Additional features are realized through the techniques of the present invention. Other embodiments are described in detail herein and are considered a part of the claimed invention. For a better understanding of the invention with the features, refer to the description and to the drawings.

DETAILED DESCRIPTION

Figure 1:
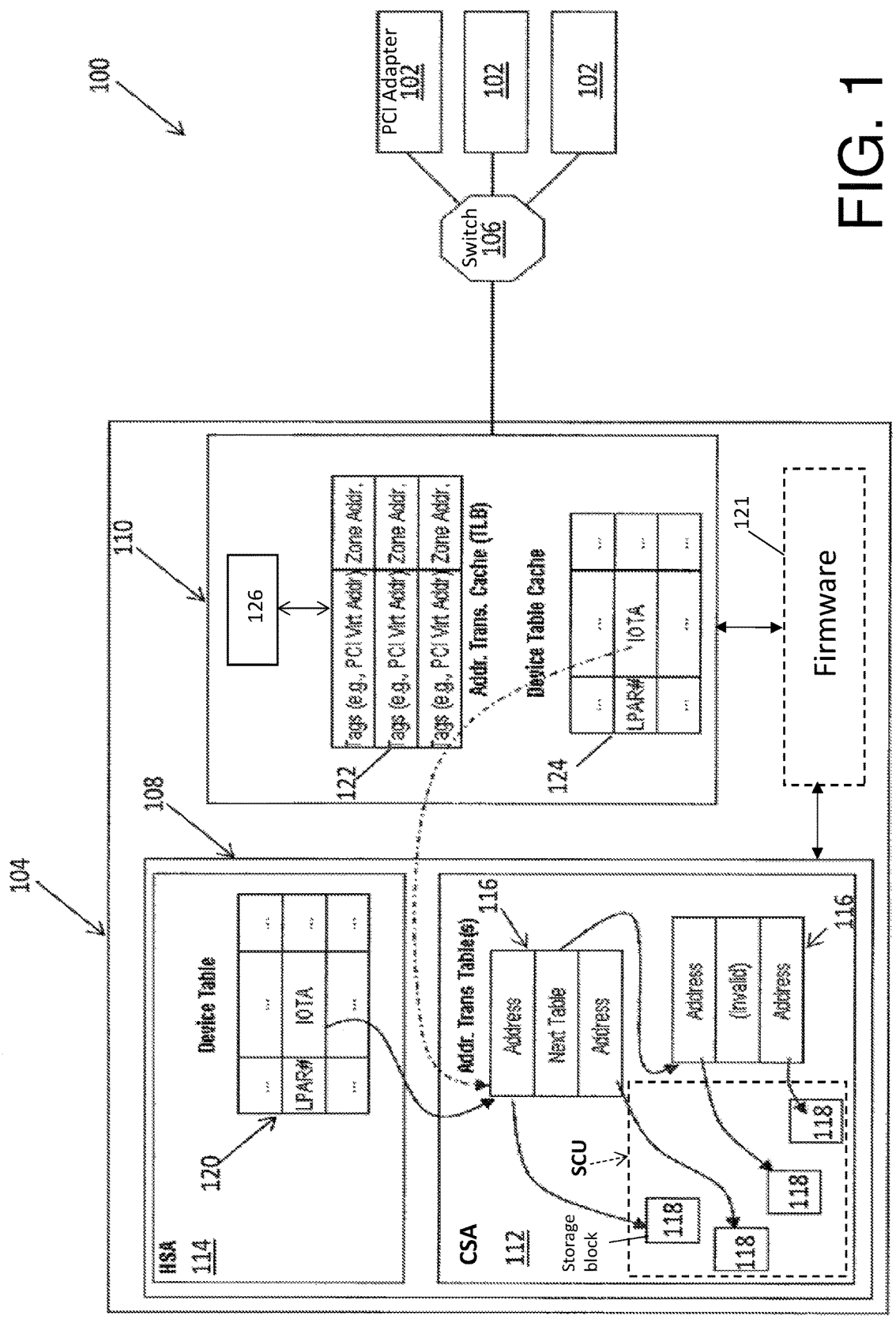
FIG. 1 depicts a computer system environment in accordance with a non-limiting embodiment.

With reference now to FIG. 1, a computer system 100 is generally shown according to an exemplary embodiment. The computer system 100 includes one or more PCI adapters 102 in electrical communication with a computer processor 104. The PCI adapters 102 may contain one or more PCI functions (e.g., PCI devices). The PCI adapters 102 may communicate with the computer processor 104 via a switch 106, such as a PCI Express (PCIe) switch. Although a single switch 106 is illustrated, it is appreciated that multiple switches may be included in the computer system 100. The PCI adapters 102 are configured to request access to a DMA address space in connection with a read and/or write (read/write) operation. The request may be routed over PCI or analogously over PCIe to the computer processor 104 via the switch 106 as understood by one of ordinary skill in the art.

The computer processor 104 comprises a memory unit 108 and a host bridge hardware component 110 (i.e., a host bridge computer processor). The memory unit 108 includes a customer-accessible storage area (CSA) 112 and a protected hardware-storage area (HSA) 114. The CSA 112 may comprise one or more logical partitions (LPARs). Although the CSA 112 is illustrated having a single LPAR, it is appreciated that the CSA 112 may include multiple LPARs. The LPAR stores one or more address translation tables 116. The address translation tables 116 may also be stored in the HSA 114. Each address translation table 116 maps one or more virtual addresses to respective blocks of absolute data storage, i.e., data storage blocks 118 as understood by one of ordinary skill in the art. The data storage blocks 118 may comprise blocks of various storage page or frame sizes. For example, a virtual address is generally broken into pages, segments, and, when necessary, regions. The underlying block(s) of real or absolute storage to which the virtual address translates is referred to as a frame (or page frame, segment frame, and region frame).

The CSA 112 may further include a storage control unit (SCU) 119 configured to control data transfer between the CSA 112 and the host bridge 110. The SCU 119 and the host bridge 110 may communicate via any network or communication system known in the art. In at least one embodiment, the SCU 119 is located on the remote side of the link as opposed to being integrated in the host bridge 110. However, the data storage blocks 118, address translation table(s) 116, and the device table(s) 120 may still reside in memory.

The HSA 114 is a storage area of memory in which the device table 120 resides. Firmware 121 executed by the computer processor 104 stores data into the device-table entries. For example, the device table 120 lists one or more input/output translation anchors (IOTAs), each of which points to a series of one or more address translation tables stored in a corresponding LPAR or the HSA 114. The HSA 114 is accessible by firmware 121 of the computer processor 104. In this regard, the computer processor 104 determines which particular data storage blocks 118 correspond to a respective virtual address mapped through the address translation tables 116.

The firmware 121 is also in communication with a device driver or program associated with a device and may initiate opening of an address translation page for a transaction of a corresponding device. In this manner, the firmware 121 may obtain from the device information indicating the amount of data that will be transferred into the initiated address page. Accordingly, the firmware is made aware of the expected data for the address mapping.

The host bridge 110 bridges a PCI interface with a memory bus installed in the computer processor 104. In this regard, the host bridge 110 allows the PCI adapters 102 and the memory unit 108 to communicate with one another. The host bridge 110 includes one or more PCI input/output (I/O) translation-look-aside buffers (TLBs) such as an address translation (AT) cache 122, for example, and one or more device table caches (DTC) 124. According to an embodiment, the host bridge 110 directly accesses each AT cache 122. The AT cache 122 is a high-speed cache of previous PCI address-translations, which allows for reducing the number of main-storage accesses needed to perform subsequent translations. The DTC 124 may include various selected entries corresponding to a PCI function associated with a respective PCI adapter 102. In this regard, the AT cache 122 and the DTC 124 are utilized by a dynamic memory access (DMA) operation to translate a PCI virtual address into an absolute address corresponding to a PCI function associated with the respective PCI adapter 102 as understood by one of ordinary skill in the art. With respect to the DTC 124, for example, a device table may be disposed in the memory unit 108, e.g., in dynamic read access memory (DRAM)). The host bridge 110 fetches one or more device table entries from among several entries (e.g., 64,000 entries in the device table) as required and maintains them in the DTC 124, which includes a much lower number of entries (e.g. 64 entries). In at least one embodiment, a device table entry is selected from a device table, loaded into the DTC 124, and the data packets or an amount of data corresponding to the device table entry transaction are transferred using the selected device table entry. Accordingly, when a first packet transferred according to the requested device table entry transaction is detected by the host bridge 110, the corresponding device table entry is extracted from the memory unit 108 and loaded into the DTC 124. Similarly, the host bridge 110 may determine a total data length of an address translation entry to be transferred during an I/O transaction. The host bridge may select an address translation entry from an address translation table, load the address translation entry into the address translation cache, and transfer data corresponding to the I/O transaction using the selected address translation entry. In this manner, the host bridge may monitor the amount of data transferred using the selected address translation entry. A transaction may not have a 1:1 relation to a memory page. For example, depending on the I/O protocol, this can be 1:N relation (one transaction spanning many memory pages) or even an M:1 relation (several transactions targeting the same memory page), also M:N would be possible.

The computer processor 104 may dynamically update the translation tables 116 based on various system needs. As a result, the AT cache 122 and the DTC 124 must be refreshed and previously cached translation entries (i.e., AT entries and device table entries) are purged. In terms of a PCI instruction, for example, a device table entry in the device table of the memory unit 108 is updated and a corresponding device table entry in DTC 124 in the host bridge 110 is flushed in synchronization with the PCI instruction to prevent an obsolete copy of the device table entry being used by the host bridge 110.

A PCI adapter 102 may request data stored in one or more data storage blocks 118 which correspond to the PCI function associated with the PCI adapter 102. In addition, an external storage control unit or other device may request data read or stored over the PCIe link. When requesting the data from the storage blocks 118, the PCI adapter 102 communicates a direct memory access (DMA) message to the host bridge 110 via the switch 106. The DMA message includes an anticipated virtual address and a request identifier (RID). The anticipated virtual address is generated by the PCI function associated with the PCI adapter 102. The resource identification value (RID) may be utilized as an index into the device table 120, to obtain a device table entry that contains the IOTA. A portion of the PCIe address may also be used as an index into the device table 120. The IOTA in turn indicates the proper set of address translation tables 116 including the mapping of the virtual address to the data storage block 118 sought by the PCI adapter 102 or storage control unit. Accordingly, the anticipated virtual address may be translated into an absolute address associated with a respective data storage block 118. Although I/O storage is described above, the invention is not limited thereto. For example, various embodiments described herein may apply to other I/O operations including, but not limited to, networking operations.

Still referring to FIG. 1, the host bridge 110 may also implement a hardware state machine 126 which includes one or more data counters. In at least one embodiment, a data counter is associated with an ensuing address translation. A counter index may be provided for each address translation so that the counters can be selectively associated with one or more address translation entries, and particular counters can be associated with a single device table entry to provide counts on a PCI function basis.

Prior to initiating transfer of the data associated with the address translation, the firmware communicates the expected amount of data that will be transferred corresponding to the ensuing address translation. In response to receiving the expected data amount information from the firmware 121, the host bridge 110 sets the data counter to the expected data value specified by the firmware. In at least one embodiment, the firmware 121 may write a value indicative of the expected data amount to a memory location that is accessible by the host bridge 110. In this manner, the host bridge 110 may access the memory location to and read the data value to determine the amount of data that is expected to be transferred to a certain page corresponding to an address translation cache entry. This allows the host bridge to set the initial value of the data counter to the value that matches the expected data transfer amount before the ensuing address translation transaction is started. In at least one embodiment, the expected count can be made part of the actual address translation entry. In this manner, the expected count may be retrieved when performing the AT fetch.

When the transfer of data corresponding to the address translation commences, the corresponding data counter is operated on by the host bridge 110 as each DMA read or write request is processed. For example, as the host bridge 110 detects a data packet or an amount of data is transferred into a pager covered by a certain address translation cache entry, the host bridge 110 decrements the data counter associated with this entry from the initial value. Accordingly, the host bridge 110 is made aware of the activity for a page covered by an AT entry and is capable of monitoring the activity for each PCI function/group of PCI functions.

When the data counter reaches a threshold value (e.g., zero), the host bridge 110 determines that it has received all the data corresponding to the address translation and determines the transfer into this page has completed. In response the completed usage of the translation entry, the host bridge 110 automatically purges the address translation from the AT cache 122 without requiring the need to receive a purge command from firmware. In this manner, I/O transaction latency along and AT cache entry busy-time is significantly reduced compared to a conventional system that relies on the firmware to output a purge command to force purging of the AT cache.

Figure 2:
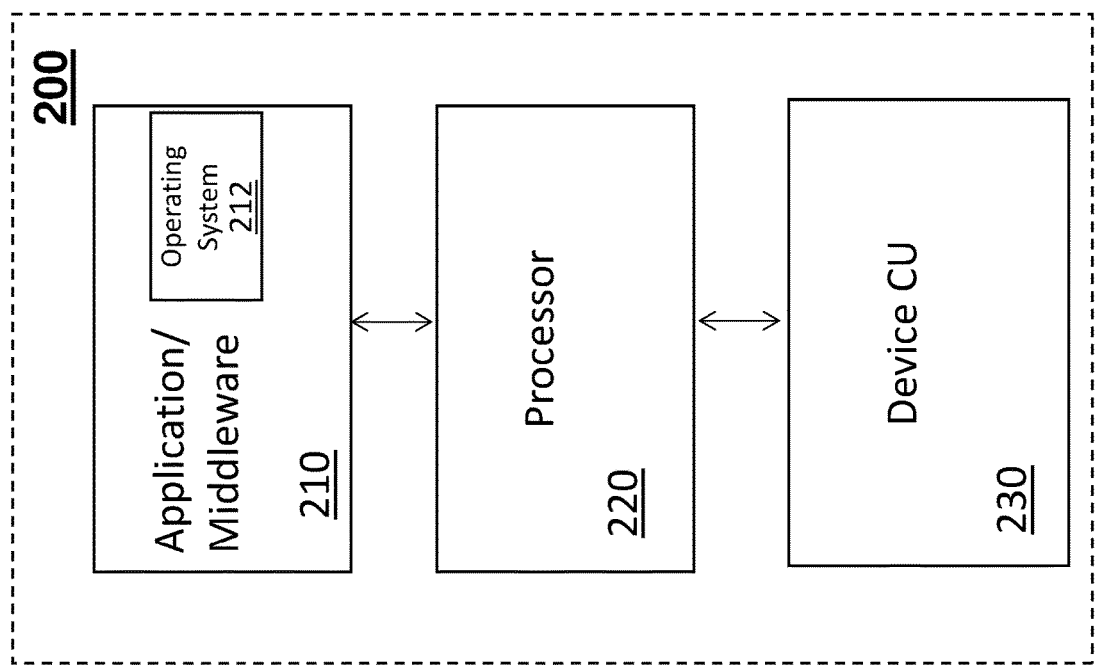
FIG. 2 illustrates a block diagram of a system for performing I/O in accordance with a non-limiting embodiment.

Turning now to FIG. 2, a block diagram of a system 200 (e.g., synchronous system 200) for performing I/O is generally shown in accordance with an embodiment. The system 200 shown in FIG. 2 operates to control data flow between one or more PCI device (e.g., PCIe device). According to a non-limiting embodiment, the PCI device includes an application/middleware 210, one or more physical processors 220, and one or more device control units 230. Although these devices are described, it should be appreciated that the invention is not limited thereto and that other PCI device may be implemented.

The application/middleware 210 can include any application software that requires access to data located on the device CU 230. The device CU 230 locates the data corresponding to a particular transaction (e.g., the data to be read), and transfers the data to the OS 212 using a device table entry that is dynamically selected. The device table entry may be dynamically selected by firmware, or in some embodiment, may be dynamically selected by the host bridge. It should be appreciated that various embodiment described herein may also be applied to any other type of I/O operation including, but not limited to, networking.

The device CU 230 may be used by various data management systems including, but not limited to, an OS 212, a filesystem (e.g., z/OS Distributed File Service System z File System produced by IBM), a hierarchical database manager (e.g. IMS® produced by IBM), or an access method used by applications (e.g. virtual storage access method, queued sequential access method, basic sequential access method).

The OS 212 receives the unit of work request and communicates with the processor 220 to request a data record from the device CU 230, to receive the data record from the device CU 230, to update the received data record, to request the device CU 230 to write the updated data record, and to receive a confirmation that the updated data recorded was successfully written to the device CU 230. The OS 212 processes them. The device CU 230 communicates with the processor 220 to service various requests from the processor 220, e.g., in a synchronous manner.

In at least one embodiment, a data counter (not shown in FIG. 2) is included in the system 200. The counter is operated (e.g., decremented) as data packets or the data for the address translation entry are transferred from the device CU 230 using an address translation table entry for processing by the OS 212. In at least one embodiment, the initial value of the counter is set to be equal to a total byte length of the requested data record targeting the buffer(s) covered by the address translation entry prior to beginning the transaction. When the counter reaches zero (0), the usage of the address translation cache entry is deemed complete, and the system hardware (e.g., host bridge) automatically purges from the address translation cache the entry corresponding to the buffer of which the data has been completely transmitted. In at least one embodiment, the counter is incremented in response to each AT entry as opposed to transfer of an individual data bit.

Figure 3:
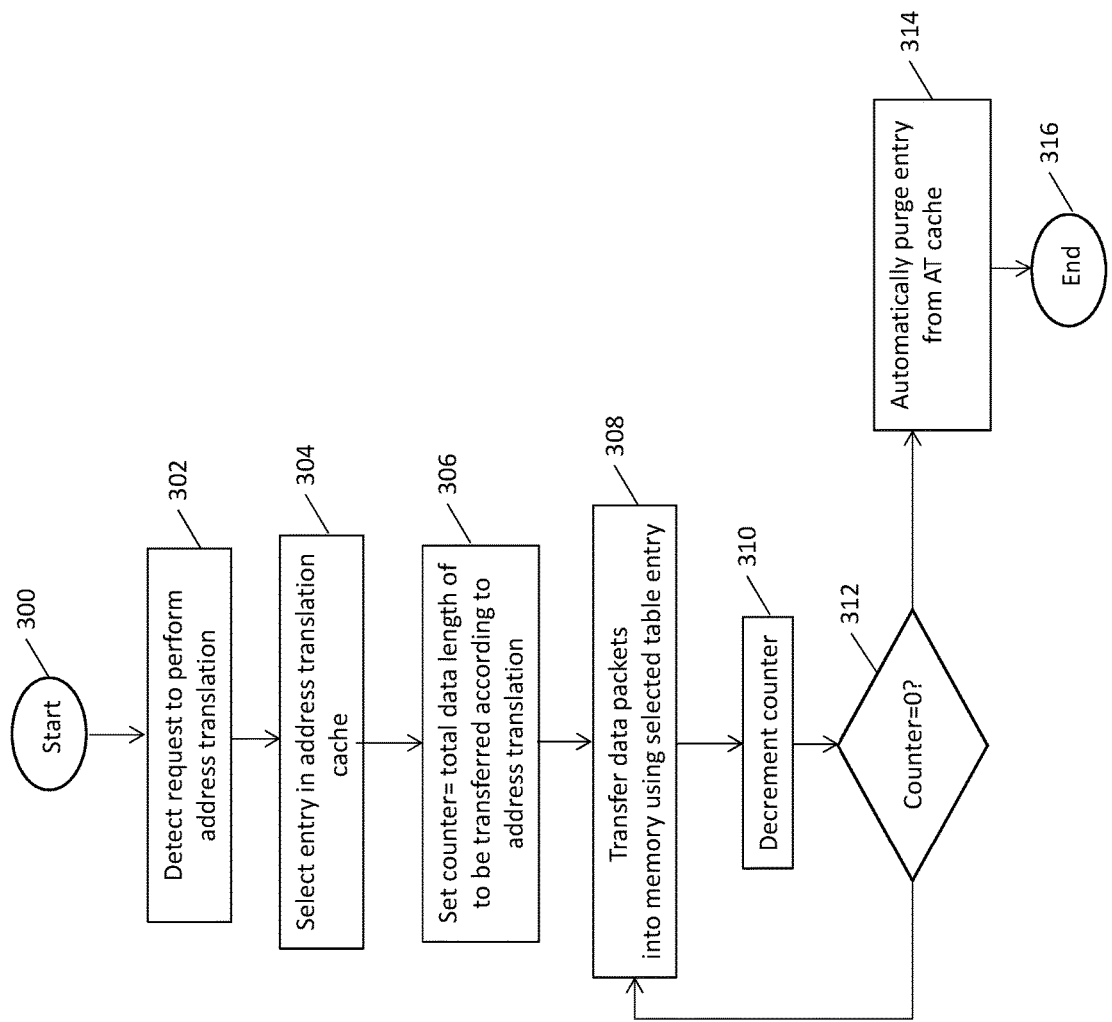
FIG. 3 is a flow diagram illustrating a method of automatically purging entries from an address translation cache without firmware assistance according to a non-limiting embodiment.

With reference now to FIG. 3, a method of automatically purging entries from an address translation cache without firmware assistance is illustrated according to a non-limiting embodiment. The method begins at operation 300, and at operation 302 a request to perform an address translation is detected. At operation 304, an entry is selected from an address translation table to be included in the address translation cache. In at least one embodiment, firmware of the I/O computing system dynamically selects the address translation entry to be used for the transaction and sets up the address translation with the parameters applicable for the ensuing transaction. The parameters include, for example, the address translation information, and the number of total bytes that is supposed to be transferred into the storage area covered by the address translation entry. At operation 306, a host bridge sets an initial value of a data counter equal to a total transaction data length, i.e., the number of total bytes to be exchanged for completing the transaction. In at least one embodiment, the data length may be part of the address translation entry itself, and the initial value may be communicated from firmware to the host bridge. The firmware may also write the expected data amount to a memory location that is accessible by the host bridge. Accordingly, the host bridge is capable of determining the number of total bytes to be exchanged using the address translation entry. At operation 308, the data packets or the data are transferred using the selected entry. That is, data is transferred to the memory, but information from the address translation entry is used to perform the data transfer.

At operation 310, the host bridge decrements the counter according to the data packets or the amount of data for the address translation entry transferred at operation 308. At operation 312, the counter is monitored to determine whether the current counter value has reached zero (0). When the counter has not reached 0, the counter returns to operation 308 and the data packets or the amount of data of for the address translation entry continues to be transferred. When, however, the counter has reached 0, the method proceeds to operation 314 during which the host bridge automatically purges from the address translation cache the entry corresponding to the expired address translation entry without receiving a purge command from the firmware, and the method ends at operation 316.

Figure 4:
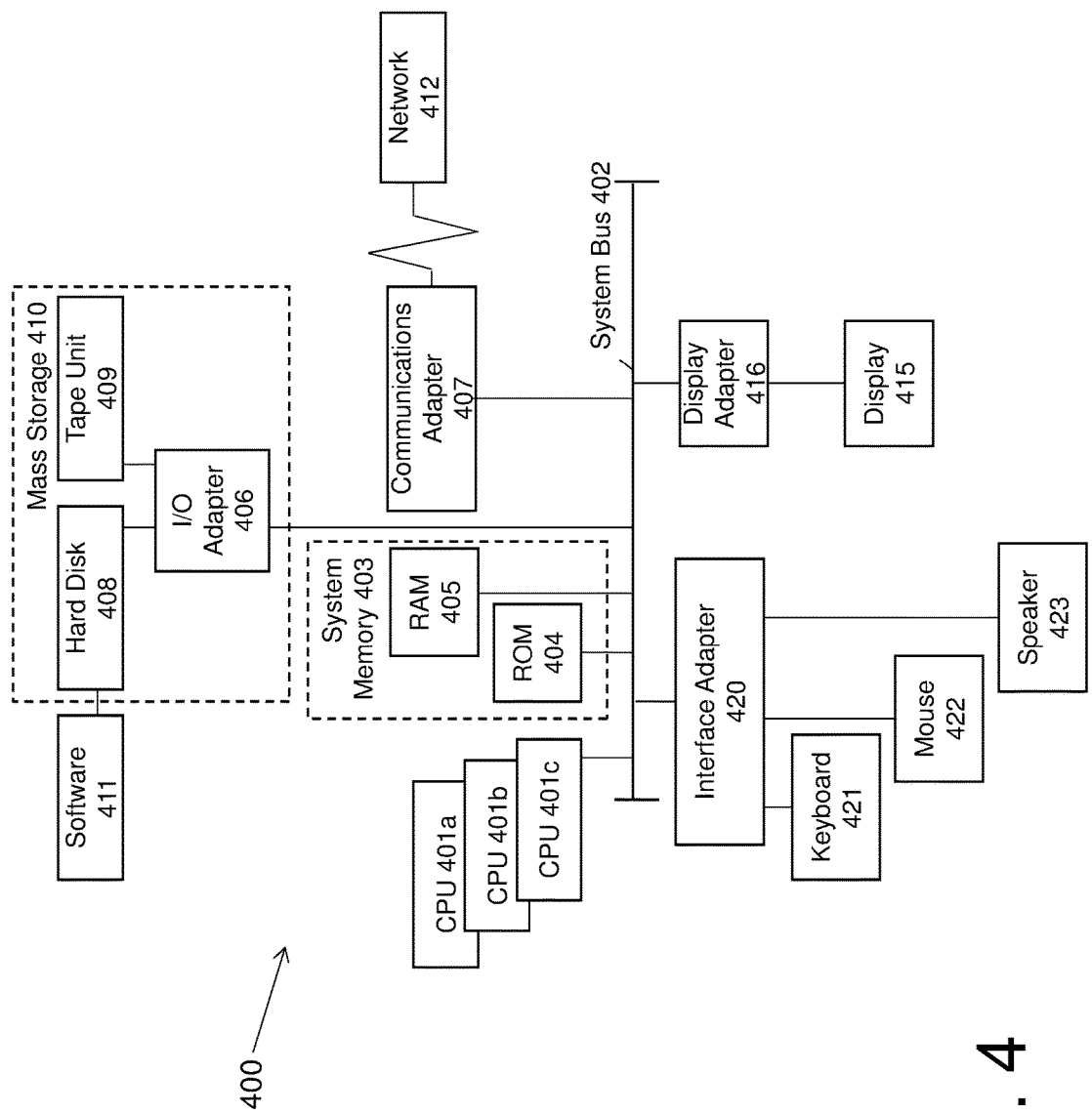
FIG. 4 illustrates a processing system capable of implementing a synchronous I/O computing system configured to automatically purge entries from an address translation cache without firmware assistance according to a non-limiting embodiment.

Turning to FIG. 4, there is shown an embodiment of a processing system 400 for implementing the teachings herein. In this embodiment, the processing system 400 has one or more central processing units (processors) 401a, 401b, 401c, etc. (collectively or generically referred to as processor(s) 401). The processors 401, also referred to as processing circuits, are coupled via a system bus 402 to system memory 403 and various other components. The system memory 403 can include read only memory (ROM) 404 and random access memory (RAM) 405. The ROM 404 is coupled to system bus 402 and may include a basic input/output system (BIOS), which controls certain basic functions of the processing system 400. RAM is read-write memory coupled to system bus 402 for use by processors 401.

FIG. 4 further depicts an input/output (I/O) adapter 406 and a network adapter 407 coupled to the system bus 402. I/O adapter 406 may be a small computer system interface (SCSI) adapter that communicates with a hard disk 408 and/or tape storage drive 409 or any other similar component. I/O adapter 406, hard disk 408, and tape storage drive 409 are collectively referred to herein as mass storage 410. Software 411 for execution on processing system 400 may be stored in mass storage 410. The mass storage 410 is an example of a tangible storage medium readable by the processors 401, where the software 411 is stored as instructions for execution by the processors 401 to perform a method, such as the process flows above. The network adapter 407 interconnects system bus 402 with an outside network 412 enabling processing system 400 to communicate with other such systems. A screen 415 (e.g., a display monitor) is connected to system bus 402 by display adapter 416, which may include a graphics controller to improve the performance of graphics intensive applications and a video controller. In one embodiment, adapters 406, 407, and 416 may be connected to one or more I/O buses that are connected to system bus 402 via an intermediate bus bridge (not shown). Suitable I/O buses for connecting peripheral devices such as hard disk controllers, network adapters, and graphics adapters typically include common protocols, such as a Peripheral Component Interconnect (PCI) or PCI express (PCIe). Additional input/output devices are shown as connected to system bus 402 via an interface adapter 420 and the display adapter 416. A keyboard 421, mouse 422, and speaker 423 can be interconnected to system bus 402 via interface adapter 420, which may include, for example, a Super I/O chip integrating multiple device adapters into a single integrated circuit.

Thus, as configured in FIG. 4, processing system 400 includes processing capability in the form of processors 401, and, storage capability including system memory 403 and mass storage 410, input means such as keyboard 421 and mouse 422, and output capability including speaker 423 and display 415. In one embodiment, a portion of system memory 403 and mass storage 410 collectively store an operating system, such as the z/OS or AIX operating system from IBM Corporation, to coordinate the functions of the various components shown in FIG. 4.

For instance, asynchronous/traditional I/O commands include the disadvantage that while waiting on an I/O operation to complete, a processor executes other productive work, causing overhead for un-dispatch and re-dispatch, context switch overhead with the I/O interrupt and the processor cache content change. In contrast, embodiments herein allow multiple synchronous I/O commands to be initiated, thus allowing multiple synchronous I/O operations to begin, while also allowing additional work to be performed before resuming the command to determine when the I/O operation completes. Further, synchronous I/O commands allow an operating system to issue multiple synchronous I/O commands to multiple targets or transfer multiple records to the same or different targets, to achieve parallelism and thus improved performance over multiple operations.

In another example, traditional enterprise storage attachments, such as Fiber Connection (FICON) and Fibre Channel Protocol (FCP), have multiple protocol layers that require several hardware, firmware and software levels of processing which cause overhead and add latency. In contrast, the synchronous I/O of embodiments herein eliminates many of these layers, thus improving system efficiency while providing the enterprise qualities of service that includes end-to-end data integrity checking, in-band instrumentation and measurements, workload management and continuous availability with predictable and repeatable high performance.

As used herein, the term "firmware" refers to privileged code running on the processor that interfaces with the hardware used for the I/O communications; a hypervisor; and/or other OS software.

Embodiments described herein utilize peripheral component interconnect express (PCIe) as an example of a low latency I/O interface that may be implemented by embodiments. Other low latency I/O interfaces, such as, but not limited to Infiniband™ as defined by the InfiniBand Trade Association and zSystems coupling links can also be implemented by embodiments.

As used herein, the term "persistent storage control unit" or "persistent SCU" refers to a storage area network (SAN) attached storage subsystem with a media that will store data that can be accessed after a power failure. As known in the art, persistent SCUs are utilized to provide secure data storage even in the event of a system failure. Persistent SCUs can also provide backup and replication to avoid data loss. A single persistent SCU is typically attached to a SAN and accessible by multiple processors.

As used herein, the term "synchronous I/O" refers to a CPU synchronous command that is used to read or write one or more data records, such that when the command completes successfully, the one or more data records are guaranteed to have been transferred to or from the persistent storage control unit into host processor memory.

As used herein, the term "module" refers to an application specific integrated circuit (ASIC), an electronic circuit, an electronic computer processor (shared, dedicated, or group) and memory that executes one or more software or firmware programs, a hardware microprocessor, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of purging an address translation cache included in a computing system, the method comprising:
    issuing, via an operating system running on the computing system, a command indicating a request to perform an input/output (I/O) transaction requiring one or more address translation entries;
    determining, via a host bridge, a total data length of the address translation entry to be transferred during the I/O transaction;
    selecting an address translation entry from an address translation table, loading the address translation entry into the address translation cache, and transferring data corresponding to the I/O transaction using the selected address translation entry;
    monitoring, via the host bridge, the amount of data transferred using the selected address translation entry; and
    automatically purging the selected address translation entry from the address translation cache, via the host bridge, in response to determining the transferred amount of data matches the total data length for the address translation entry.

2. The method of claim 1, wherein the monitoring includes operating a data counter to count the amount of data transferred using the address translation entry.

3. The method of claim 2, wherein the host bridge performs the operations of:
    setting the data counter to an initial value prior to transferring the data for the address translation entry;
    decrementing the data counter each time the data is transferred using the address translation entry; and
    automatically purging the selected address translation entry without receiving a purge command from firmware when the data counter reaches a final value indicating the I/O transaction is complete.

4. The method of claim 3, wherein the initial value equals the total data length and the final value equal zero.

5. The method of claim 1, wherein determining the total data length of the address translation entry to be transferred during the I/O transaction includes communicating the total data length from firmware to the host bridge.

6. The method of claim 1, wherein determining the total data length of the address translation entry to be transferred during the I/O transaction includes accessing, via the host bridge, a memory area containing a value indicating the total data length, and wherein the data length is part of the address translation entry itself.

7. The method of claim 6, wherein the determining the total data length of the address translation entry includes:
    setting up the address translation table, via firmware, in response to the command;
    determining the total data length in response to setting up the address translation table;
    writing, via the firmware, the value indicative of the total data length into the memory area; and
    accessing, via the host bridge, the memory area and reading the value to obtain the total data length.

8. A computing system comprising a processor and a memory unit that stores program instructions, the system configured to purge an entry from an address translation cache in response to the processor executing the program instructions to perform:
    issuing, via an operating system running on the computing system, a command indicating a request to perform an input/output (I/O) transaction requiring one or more address translation entries;
    determining, via a host bridge, a total data length of the address translation entry to be transferred during the I/O transaction;
    selecting an address translation entry from an address translation table, loading the address translation entry into the address translation cache, and transferring data corresponding to the I/O transaction using the selected address translation entry;
    monitoring, via the host bridge, the amount of data transferred using the selected address translation entry; and
    automatically purging the selected address translation entry from the address translation cache, via the host bridge, in response to determining the transferred amount of data matches the total data length for the address translation entry.

9. The computing system of claim 8, wherein the monitoring includes operating a data counter to count the amount of data transferred using the address translation entry.

10. The computing system of claim 9, wherein the host bridge performs the operations of:
    setting the data counter to an initial value prior to transferring the an amount of data for the address translation entry;
    decrementing the data counter each time data is transferred using the address translation entry; and
    automatically purging the selected address translation entry without receiving a purge command from firmware when the data counter reaches a final value indicating the I/O transaction is complete.

11. The computing system of claim 10, wherein the initial value equals the total data length and the final value equal zero.

12. The computing system of claim 8, wherein determining the total data length of the address translation entry to be transferred during the I/O transaction includes communicating the total data length from firmware to the host bridge.

13. The computing system of claim 8, wherein determining the total data length of the address translation entry to be transferred during the I/O transaction comprises:
   setting up the address translation table, via firmware, in response to the command;
   determining the total data length in response to setting up the address translation table;
   writing, via the firmware, a value indicative of the total data length into a memory area; and
   accessing, via the host bridge, the memory area and reading the value to obtain the total data length.

* * * * *